No. 740,864. Patented October 6, 1903.

UNITED STATES PATENT OFFICE.

GEORGE FRANÇOIS JAUBERT, OF PARIS, FRANCE.

EXPLOSION-ENGINE.

SPECIFICATION forming part of Letters Patent No. 740,864, dated October 6, 1903.

Application filed October 23, 1901. Serial No. 79,644. (No model.)

*To all whom it may concern:*

Be it known that I, GEORGE FRANÇOIS JAUBERT, a citizen of Switzerland, and a resident of No. 155 Boulevard Malesherbes, Paris, France, have invented a new and useful Improvement in Explosion-Engines, which improvement is fully set forth in the following specification.

This invention refers to improvements in explosion-engines.

By supplying engines with explosive gas (petroleum-oil gas, producer-gas, or like gases) by means of superoxygenated air or oxygen in place of with ordinary air a better efficiency is obtained with an equal quantity of combustible material. This efficiency is increased by operating with a closed circuit, among the advantages that are thereby attained being that I do not foul the local atmosphere where the motor is being operated and that having no escapement to the air I suppress all cause of fires. This is of particular importance, for example, where the engine is used in the vicinity of oil-wells or dirigible balloons, &c., where the discharge of the heated products of combustion in the atmosphere might result in damaging conflagration. Also after purification the escaping gas is not formed solely of nitrogen, but also of appreciable quantities of oxygen and of gaseous carbids, which latter are returned to the cycle to be utilized, and, further, by the employment of the closed cycle I utilize only the purified gas of combustion mixed with a certain quantity of pure oxygen without drawing on the atmospheric air. In mine-pits, for example, such air would be needed for the respiration of workmen.

Figure 1:
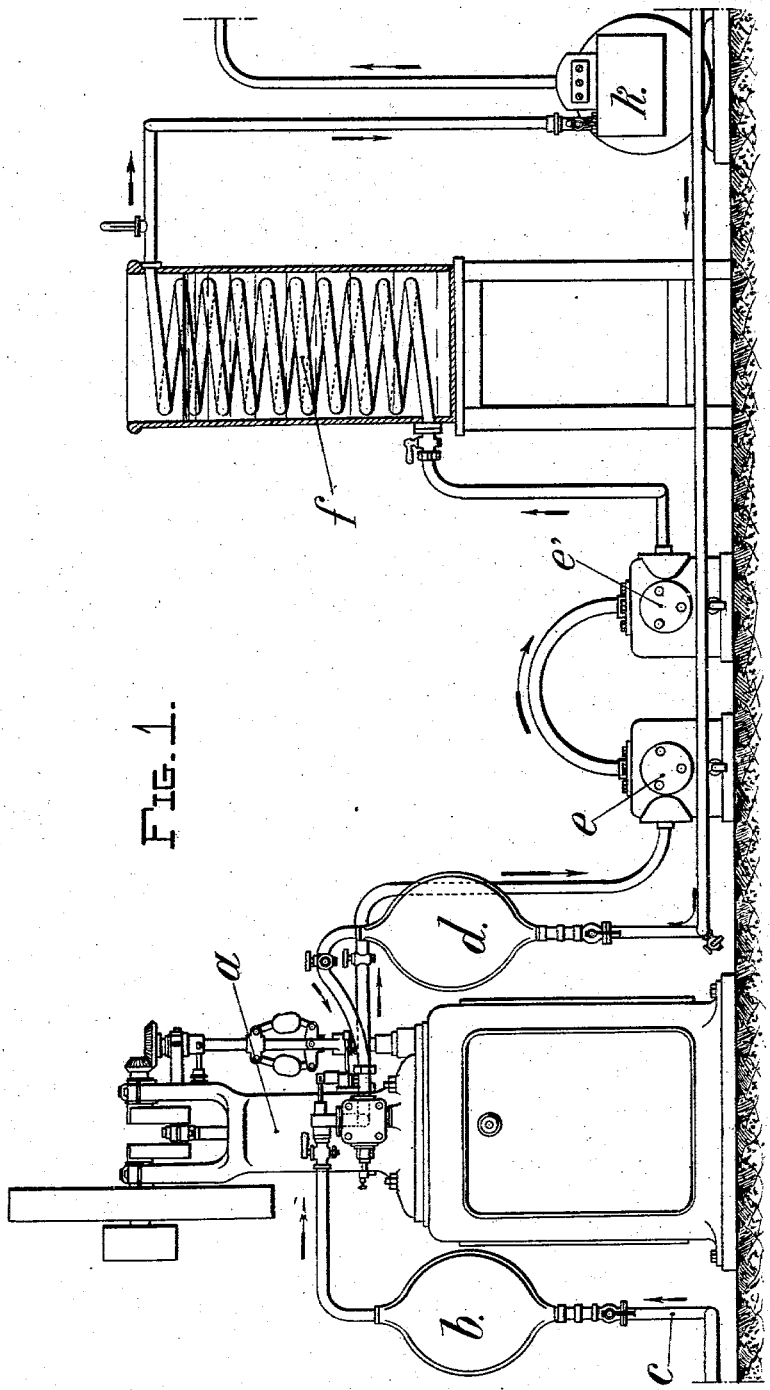
Figure 2:
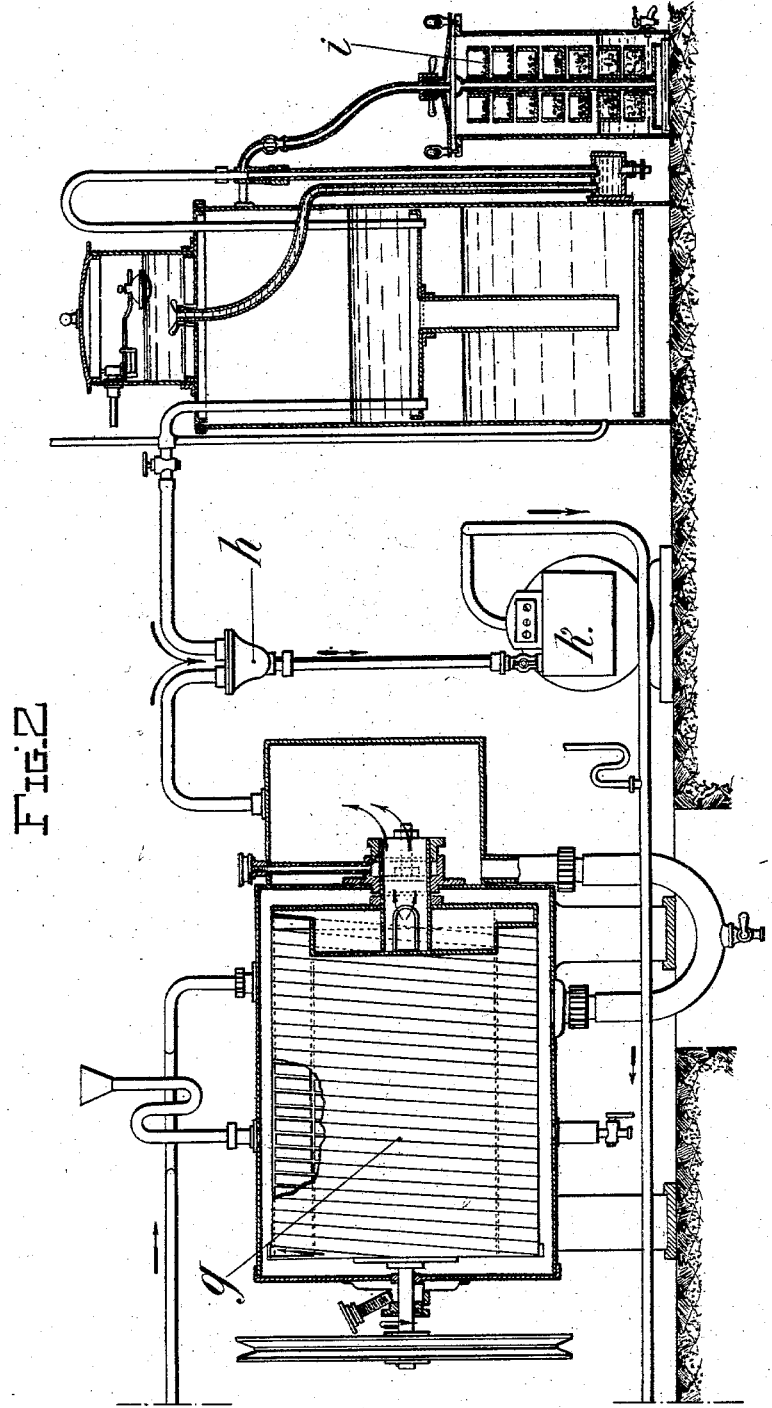

The invention will be readily understood by reference to the accompanying drawings, wherein a complete system is shown, partly in Figure 1 and the remainder in Fig. 2.

$a$ is a gas-engine, which draws the combustible gas from a rubber pocket $b$, into which it is emptied from the conduit $c$ after having traversed a suitable meter. (Not shown.) The regenerated air is drawn from the rubber pocket $d$. After combustion the exhaust-gases escape from the engine $a$ and having passed through a suitable expansion-chamber $e\ e'$ are cooled in a worm $f$, which is surrounded by cold water. From thence they pass into a purifier $g$ of the scrubber type (I have employed with success the rotary purifier sold under the name of "Standard") containing an alkaline solution, (caustic soda, potash, or lime,) which absorbs the carbonic acid. The gases then pass to a mixer $h$, where they receive an addition of oxygen derived from the generator $i$, of any appropriate type. The regenerated gases return to the rubber pocket $d$, from which they are again aspirated by the engine. Between the generator $i$ and the engine, as well as between the worm $f$ and the scrubber $g$, suitable meters $k$ may, if desired, be interposed. As will be observed, the circuit is entirely closed.

What I claim is—

In a gas-engine, the combination with the exhaust-pipe thereof, a purifier into which the exhaust-pipe leads, of an exit-pipe leading from the purifier to a mixer having an oxygen-supply, and from thence to the inlet of the engine.

In testimony whereof I have signed this specification in the presence of two subscribing witnesses.

GEORGE FRANÇOIS JAUBERT.

Witnesses:
 C. DE MESTRAL,
 J. ALLISON BOWEN.